(12) United States Patent
Wang (10) Patent No.: US 10,416,682 B2
(45) Date of Patent: Sep. 17, 2019

(54) SEMI-AUTOMATED DRIVING USING PRE-RECORDED ROUTE

(71) Applicant: Faraday & Future Inc., Gardena, CA (US)

(72) Inventor: Chongyu Wang, San Jose, CA (US)

(73) Assignee: FARADAY & FUTURE INC., Gardena, CA (US)

( * ) Notice: Subject to any disclaimer, the term of this patent is extended or adjusted under 35 U.S.C. 154(b) by 0 days.

(21) Appl. No.: 15/662,655

(22) Filed: Jul. 28, 2017

(65) Prior Publication Data

US 2018/0196442 A1 Jul. 12, 2018

Related U.S. Application Data

(60) Provisional application No. 62/368,987, filed on Jul. 29, 2016.

(51) Int. Cl.
| | |
|---|---|
| *G05D 1/02* | (2006.01) |
| *G06K 9/00* | (2006.01) |
| *B60W 50/02* | (2012.01) |
| *B60W 50/00* | (2006.01) |

(52) U.S. Cl.
CPC .......... *G05D 1/0274* (2013.01); *B60W 50/02* (2013.01); *G05D 1/0214* (2013.01); *G05D 1/0246* (2013.01); *G06K 9/00791* (2013.01); *B60W 2050/007* (2013.01)

(58) Field of Classification Search
None
See application file for complete search history.

(56) References Cited

U.S. PATENT DOCUMENTS

| | | | |
|---|---|---|---|
| 9,248,834 B1* | 2/2016 | Ferguson | B60W 30/09 |
| 2010/0332127 A1* | 12/2010 | Imai | B60W 30/12 |
| | | | 701/532 |
| 2017/0108865 A1* | 4/2017 | Rohde | G06K 9/00845 |

\* cited by examiner

*Primary Examiner* — Richard M Camby
(74) *Attorney, Agent, or Firm* — Skyler R. Lund (57) ABSTRACT

A system for use in a vehicle, the system comprising one or more sensors, one or more processors coupled to the one or more sensors, and a memory including instructions that cause the one or more processors to perform a method. The method comprises retrieving a stored route for the vehicle that comprises a plurality of waypoints corresponding to different locations along the route, each waypoint associated with features along the route on a feature map, and navigating the vehicle along the stored route by navigating the vehicle from waypoint to waypoint in the stored route using the one or more sensors to: detect one or more features in an area surrounding the vehicle; and localize the vehicle at each waypoint by comparing the one or more features in the area surrounding the vehicle with the one or more features associated with each respective waypoint in the feature map.

18 Claims, 6 Drawing Sheets

SEMI-AUTOMATED DRIVING USING PRE-RECORDED ROUTE

CROSS-REFERENCE TO RELATED APPLICATIONS

This application claims the benefit of U.S. Provisional Application No. 62/368,987, filed Jul. 29, 2016, the entirety of which is hereby incorporated by reference.

FIELD OF THE DISCLOSURE

This relates generally to recording a driving route for autonomous vehicle navigation.

BACKGROUND OF THE DISCLOSURE

The average driver has a number of daily commutes (e.g., to work, school, daycare, etc.). While the deployment of autonomous driving technology will continue to grow in the future, automatically navigating simple daily routes does not require full vehicle autonomy. Therefore, a simple solution to record and automatically repeat daily commutes can be desirable.

SUMMARY OF THE DISCLOSURE

Examples of the disclosure are directed recording a driving route within a feature map for safe autonomous driving navigation. The vehicle can record a driving route in the form of waypoints within a feature map. The vehicle can use the feature map to follow the waypoints of the recorded route. The vehicle can also use landmarks within the feature map to verify that the vehicle is within the correct driving route. The feature map can be a simple two-dimensional map to conserve computer memory on the vehicle. Additionally, the solution can allow the driver to take over driving operations at any point of the driving route, if necessary. In this way, the vehicle can safely navigate within the feature map without requiring complete vehicle autonomy.

DETAILED DESCRIPTION

In the following description of examples, references are made to the accompanying drawings that form a part hereof, and in which it is shown by way of illustration specific examples that can be practiced. It is to be understood that other examples can be used and structural changes can be made without departing from the scope of the disclosed examples. Further, in the context of this disclosure, "autonomous driving" (or the like) can refer to either autonomous driving, partially autonomous driving, and/or driver assistance systems.

Some vehicles, such as automobiles, may include various systems and sensors for determining the vehicle's location and for detecting features about the vehicle's surroundings. Autonomous vehicles can use such information for performing autonomous driving operations. Examples of the disclosure are directed to using information (e.g., locations, landmarks, maneuvers, etc.) about a driving route for simple autonomous vehicle navigation. This driving route information can be recorded as waypoints comprising latitudinal and longitudinal points along a driving route and information about landmarks at various points along the driving route. The waypoints can further include the vehicle's speed and orientation along the driving route. The information about the landmarks along a driving route can include the distances between landmarks to various points of the driving route. In some examples, the vehicle can store this information in a simple two dimensional feature map. In this way, the vehicle can autonomously navigate itself along the driving route by simply following the stored waypoints within the feature map. This can avoid complex autonomous driving algorithms and can conserve memory on the vehicle's computer system.

Figure 1:
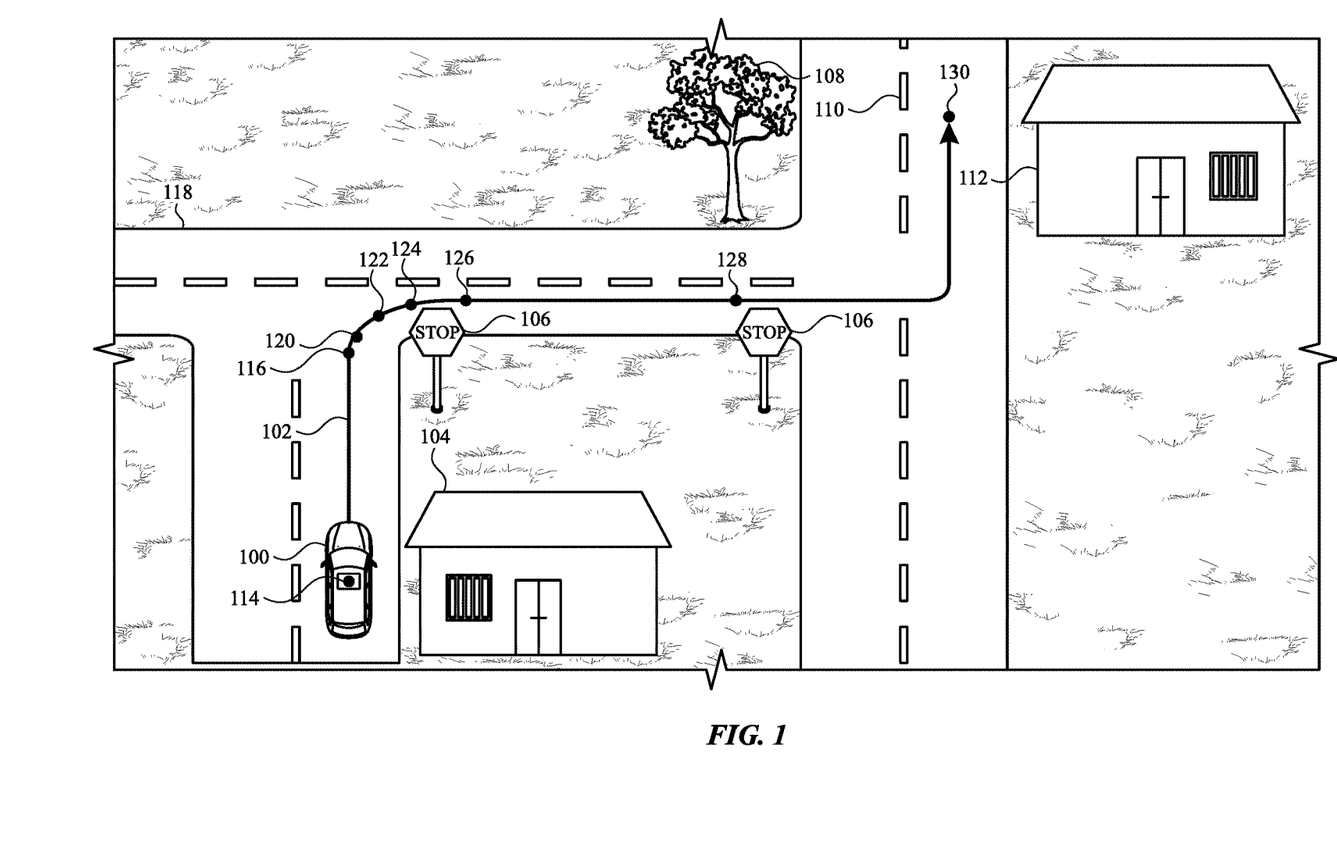
FIG. 1 illustrates an exemplary vehicle autonomously navigating along the driving route of a feature map according to examples of the disclosure.

FIG. 1 illustrates exemplary vehicle 100 driving along route 102 according to examples of the disclosure. Vehicle 100 can include various sensors and systems for determining one or more features about the vehicle's surroundings along route 102. These sensors can include cameras, radar sensors, ultrasonic sensors, laser sensors, LIDAR sensors, or any other sensors that can be used to detect one or more features about the vehicle's surroundings. These sensors can be configured on vehicle 100 to provide it with 360 degree (or other) coverage of the area surrounding the vehicle. Vehicle 100 can process data from one or more of these sensors to identify landmarks such as houses 104, traffic signs 106, street signs (not shown), traffic signals (not shown), trees 108, lane dividers 110, buildings 112, or any other object or structure that can serve as a landmark along a route. Vehicle 100 can also process data from one or more of the sensors to identify vulnerable road users (pedestrians, motorcycles, bicycles, etc.), other vehicles, or any other object along a route.

Vehicle 100 can be configured to autonomously drive along route 102 by automatically following stored waypoints. The stored waypoints defining route 102 can be created in various manners. For example, a driver of vehicle 100 can initiate a recording process for recording the route, and can subsequently drive the route. While the user is driving the route, the vehicle 100 can store various locational waypoints (e.g., along with vehicle dynamics data, such as velocity) and landmark data (e.g., the existence of, appearance of, locations of landmarks, etc.) associated with the locational waypoints, thus creating route 102 of waypoints that can be followed by the vehicle at a later time. In some examples, the vehicle can issue a notification requesting the user to drive the route in a variety of lighting conditions (morning, day, night, etc.) before allowing the route to be used in future autonomous driving. In some examples, the vehicle can match several drives as corresponding to the same route (perhaps with variations in speed, traffic conditions, lane changing, and other minor variances).

While vehicle 100 is driving along stored route 102, vehicle 100 can determine its location along route 102 through Global Positioning System (GPS) receivers, cameras, ultrasonic sensors, radar sensors, LIDAR sensors, cellular positioning systems, maps, cloud services, landmark positioning, and any other system or sensor that can be used to determine a vehicle's location. As described above, each waypoint can include its latitudinal and longitudinal points, the vehicle's speed and orientation, and/or information about surrounding landmarks. For example, FIG. 1 illustrates vehicle 100 at waypoint 114, which can include the vehicle's speed and orientation (e.g., heading north at 25 miles-per-hour), the distance and orientation of house 104 from waypoint 114 (e.g., 60 feet at 90 degrees), the distance and orientation of traffic sign 106 from waypoint 114 (e.g., 200 feet at 30 degrees). Vehicle 100 can autonomously navigate from waypoint 114 to waypoint 116. The vehicle's speed associated with waypoint 116 can be zero miles-per-hour for a preset period of time (e.g., 5 seconds, 10 seconds, etc.) to comply with traffic sign 106 (e.g., a stop sign). In some examples, vehicle 100 can use its sensors to determine when it is safe for vehicle 100 to navigate past traffic sign 106 from waypoint 116 to waypoint 120 (e.g., the vehicle does not detect oncoming vehicles, vulnerable road users, or objects on road 118). These sensors can include cameras, radar sensors, ultrasonic sensors, laser sensors, LIDAR sensors, or any other sensors that can be used to detect one or more features about the vehicle's surroundings. In some examples, the driver can notify the vehicle when it is safe to navigate past traffic sign 106 from waypoint 116 to waypoint 120 through a control system such as buttons, a touch screen, a voice command, a computer, a smart phone, or any device or system that allows user input to be entered. In some examples, the distance between waypoints along driving route 102 can vary. For example, the distance between two waypoints can be long (e.g., 10 or more feet) when the driving route is a straight line (e.g., from waypoint 114 to waypoint 116 and from waypoint 126 to waypoint 128) and/or when vehicle dynamics between waypoints are relatively constant, or can be short (e.g., one to two feet or fewer) when the driving route is curved and/or the vehicle dynamics between waypoints varies (e.g., from each waypoint between waypoint 116 and waypoint 126). In some examples, the vehicle's speed at each waypoint is not stored. Instead, the vehicle's speed along driving route 102 is controlled by the vehicle as a function of posted speed limits or other traffic signs and/or perception data such as a speed of traffic flow, sharpness of turns, pedestrians, etc. For example, vehicle 100 can use one or more of its cameras for traffic sign recognition (e.g., template matching) to determine speed limits along driving route 102. The vehicle can use this information to set the vehicle's speed.

Figure 2A:
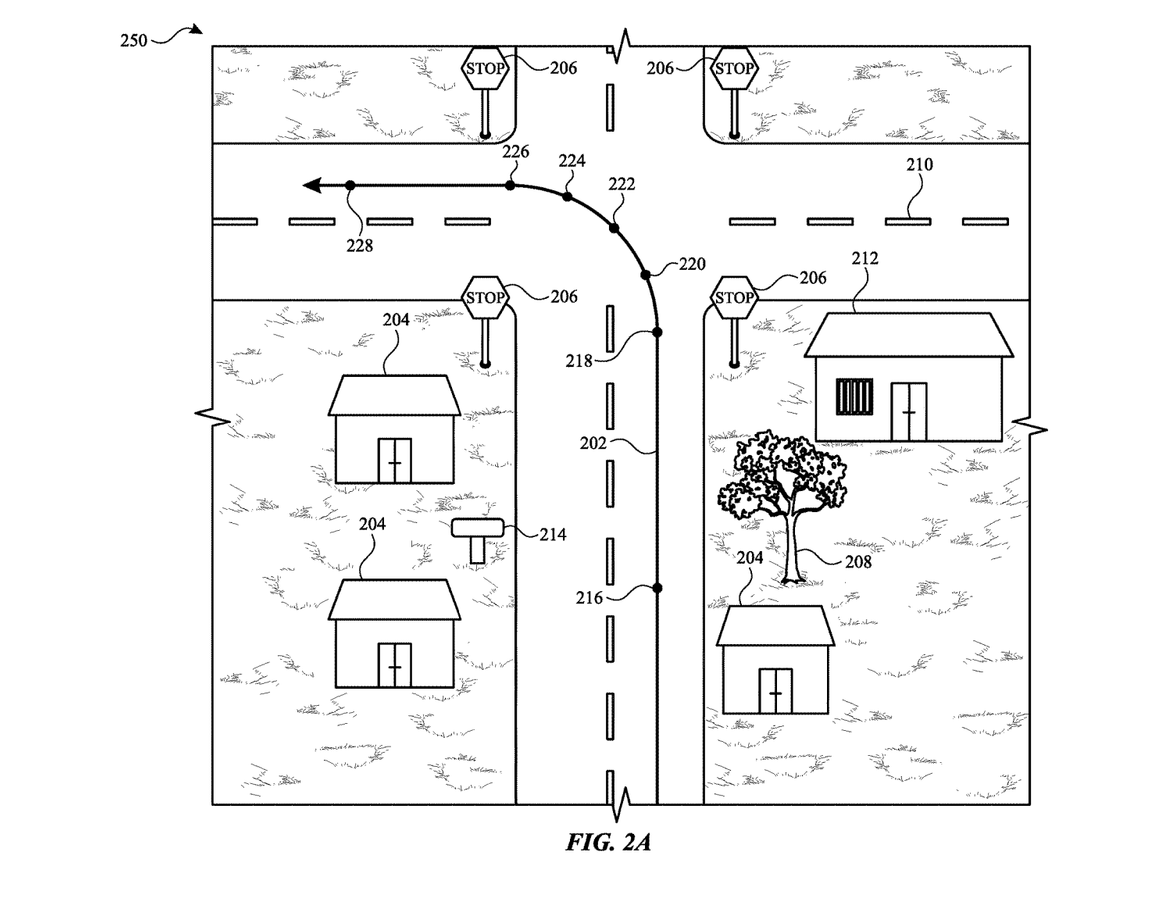
FIG. 2A illustrates an exemplary feature map with a recorded driving route according to examples of the disclosure.

FIG. 2A illustrates exemplary feature map 250 according to examples of the disclosure. Feature map 250 can be a simple two-dimensional map that can contain information about landmarks (e.g., as described above with reference to FIG. 1). Feature map can include landmarks such as houses 204, traffic signs 206, street signs (not shown), traffic signals (not shown), trees 208, lane dividers 210, buildings 212, mailboxes 214, or any other object or structure that can serve as a landmark. Feature map 200 can be generated by vehicle 100 or can be uploaded (e.g., via a wireless connection to a server, another vehicle, a computer, or other device) to vehicle 100. Feature map 200 can contain a driving route 202 as a series of waypoints (e.g., as described above with reference to FIG. 1). Driving route 202 can have a starting point and ending point (not shown).

Figure 2B:
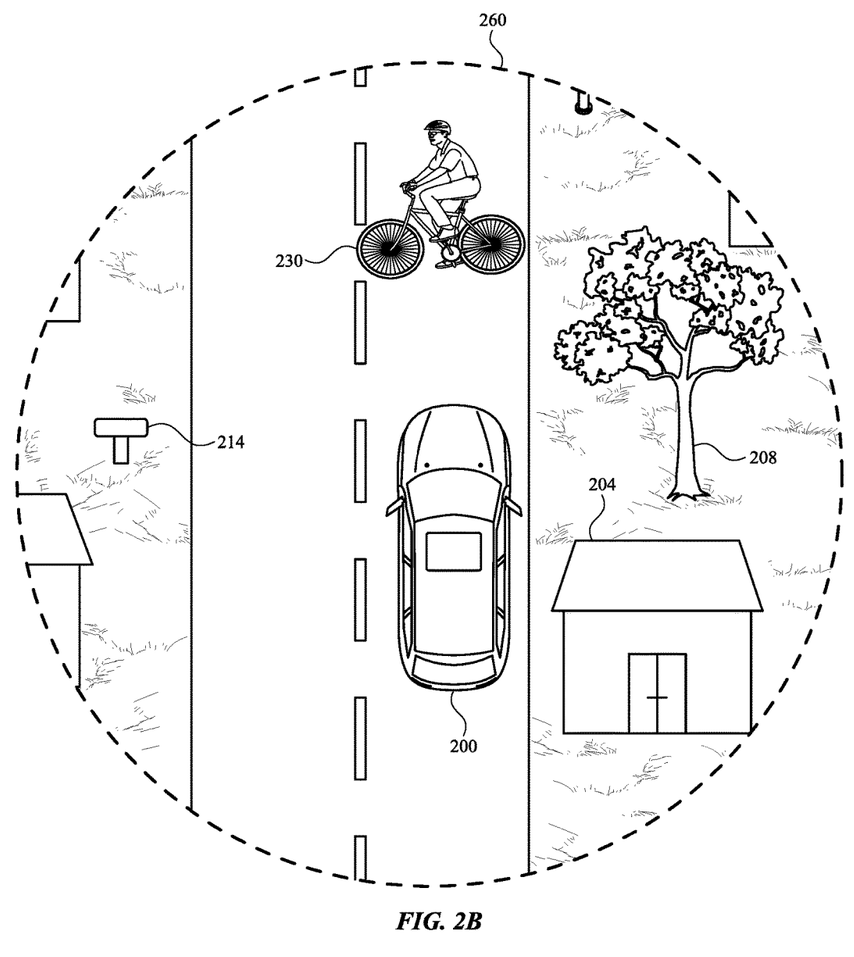
FIG. 2B illustrates an exemplary vehicle visibility area according to examples of the disclosure.

FIG. 2B illustrates exemplary vehicle visibility area 260 according to examples of the disclosure. Vehicle visibility area 260 can be the area that can be scanned by the vehicle's sensors and systems for determining one or more features about the vehicle's surroundings (e.g., one or more features described above). These sensors can include cameras, radar sensors, ultrasonic sensors, laser sensors, LIDAR sensors, or any other sensors that can be used to detect one or more features about the vehicle's surroundings. For example, FIG. 2B illustrates vehicle 200 detecting house 204, tree 208, mailbox 214, and bicycle 230. Vehicle 200 can use this information for safe vehicle navigation. In some examples, vehicle 200 can use this information to generate a feature map.

Figure 2C:
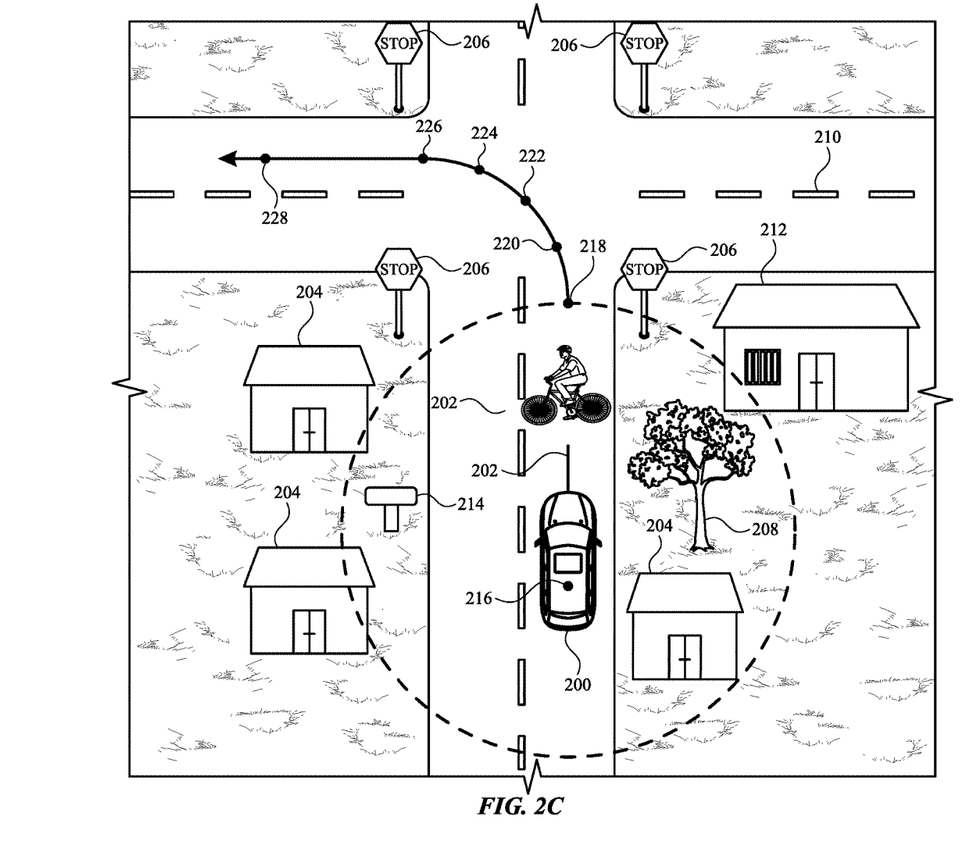
FIG. 2C illustrates an exemplary vehicle using a feature map and data from the vehicle's one or more sensors according to examples of the disclosure.

FIG. 2C illustrates how vehicle 200 can use a feature map and data from the vehicle's one or more sensors according to examples of the disclosure. Vehicle 200 can use its one or more sensors to scan vehicle visibility area 260 to continuously determine one or more features about the vehicle's surroundings while driving along route 202. In this way, vehicle 200 can verify that it is driving along the correct driving route by detecting the anticipated landmarks from feature map 250 at each waypoint. For example, vehicle 200 can detect house 204, tree 208, and mailbox 214 at waypoint 216. Vehicle 200 can also determine the distances between house 204, tree 208, and mailbox 214 at waypoint 216 from the feature map, and correct its steering to stay on driving route 202, if necessary. In some examples, vehicle 200 will stop and/or enter a manual driving mode (e.g., allow the driver to take over driving operations) if the vehicle does not detect the anticipated landmarks from the feature map. Vehicle 200 can also process data from one or more of the sensors to identify vulnerable road users (pedestrians, motorcycles, bicycles, etc.), other vehicles, or any other object along a route (e.g., objects not included in the feature map. For example, vehicle 200 can detect bicycle 230 on driving route 202. After detecting bicycle 230, vehicle 200 can take a precautionary action to avoid driving into bicycle 230. This precautionary action can include stopping the vehicle and waiting for bicycle 230 to move out of driving route 202, stopping the vehicle and waiting for the driver to indicate when it is safe to resume driving, allowing the driver to take over driving operations (e.g., enter a manual driving mode), and/or activating visual and/or audio indicators. Visual indicators can include one or more of a headlight, a hazard light, a smog light, or any light source on the outside or the inside of the vehicle. The audio indicators can include one or more of a horn, a speaker, an alarm system, and/or any other sound source in the vehicle. In some examples, vehicle 200 can use its one or more sensors to scan vehicle visibility area 260 to detect other vehicles. In this way, vehicle 200 can autonomously keep up with the flow of traffic while maintaining a safe distance from other vehicles in front of it. In some examples, vehicle 200 can use its one or more sensors to scan vehicle visibility area 260 along driving route 202 to generate feature map 250, as described in this disclosure.

Figure 3:
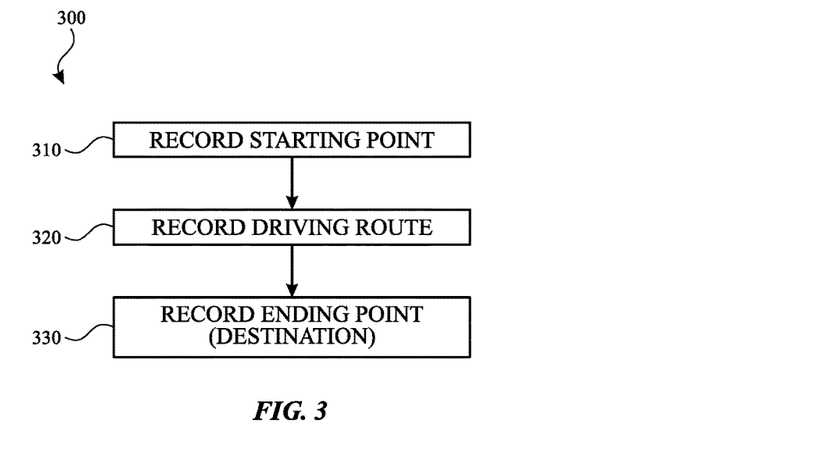
FIG. 3 illustrates an exemplary process for recording a driving route according to examples of the disclosure.

FIG. 3 illustrates exemplary process 300 for recording a driving route according to examples of the disclosure. Process 300 can be performed several times for the same driving route for optimal results. For example, process 300 can be performed at different times of the day to account for lighting differences or on different days of the week to correctly identify landmarks. In some examples, process 300 can be performed to generate or update a feature map.

At step 310, information about the starting point of the driving route can be recorded. For example, the location (latitude and longitude) of the vehicle can be determined and recorded. As described above, the vehicle's location can be determined with GPS receivers, cameras, ultrasound sensors, radar sensors, LIDAR sensors, cellular positioning systems, and any other systems or sensors that can be used to determine a vehicle's location. The vehicle can use its one or more sensors to scan for one or more features of the vehicle's surroundings (e.g., as described above with references to FIGS. 1 and 2A-2C). The vehicle can process the data from its one or more sensors to identify landmarks at the starting point of the driving route (e.g., as described above with references to FIGS. 1 and 2A-2C).

At step 320, information about the driving route can be recorded. As described above, the vehicle can save information about a driving route in the form of waypoints. For example, for each waypoint along the driving route, the vehicle can store the location of the waypoint (latitude and longitude), information about surrounding landmarks (including the direction and distance from the waypoint to each landmark), and/or the orientation and speed of the vehicle at the waypoint (e.g., as described above with references to FIGS. 1 and 2A-2C). As described above, the vehicle's location at each waypoint can be determined with GPS receivers, cameras, ultrasound sensors, radar sensors, LIDAR sensors, cellular positioning systems, and any other systems or sensors that can be used to determine a vehicle's location. The vehicle can also use one or more sensors to identify and record cautionary scenarios at step 320. For example, the vehicle can process data from one or more cameras to identify a traffic light, a yield sign, a school zone, a vulnerable road user or object on the driving route, and/or any other scenario that may require the driver to take over driving operations (e.g., enter a manual driving mode). In some examples, the vehicle can notify the driver to perform certain driving maneuvers (e.g., the vehicle can transition out of an autonomous driving mode to a manual driving mode) in circumstances other than cautionary scenarios, such as to change lanes or to perform other maneuvers.

At step 330, information about the ending point of the driving route (e.g., the destination) can be recorded. For example, the location (latitude and longitude) of the vehicle can be determined and recorded. As described above, the vehicle's location can be determined with GPS receivers, cameras, ultrasound sensors, radar sensors, LIDAR sensors, cellular positioning systems, and any other systems or sensors that can be used to determine a vehicle's location. The vehicle can use its one or more sensors to scan for one or more features of the vehicle's surroundings (e.g., as described above with references to FIGS. 1 and 2A-2C). The vehicle can process the data from its one or more sensors to identify landmarks at the ending point of the driving route (e.g., as described above with references to FIGS. 1 and 2A-2C).

Figure 4:
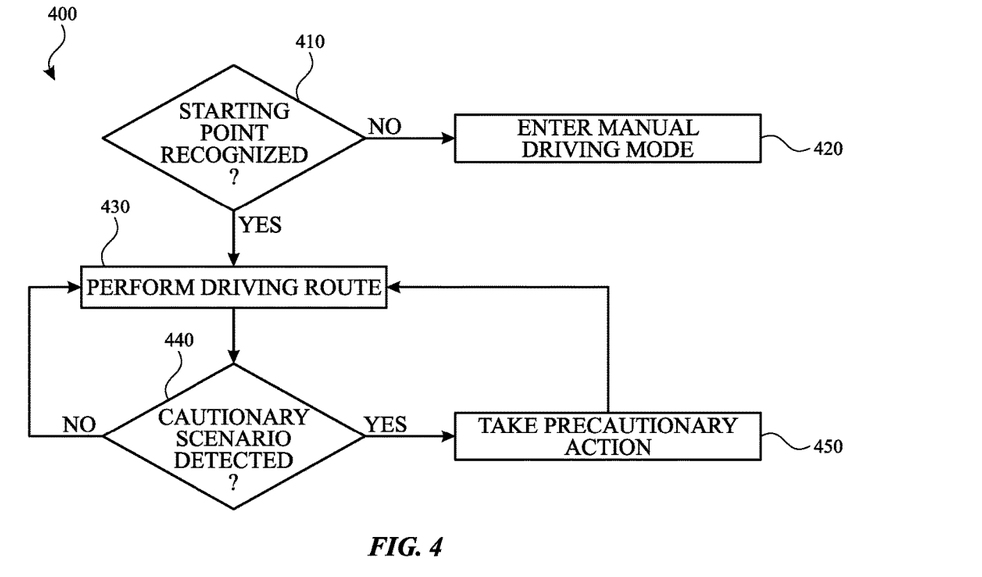
FIG. 4 illustrates an exemplary process for autonomously navigating a vehicle along a recorded driving route according to examples of the disclosure.

FIG. 4 illustrates an exemplary process 400 for autonomously navigating a vehicle along a stored driving route according to examples of the disclosure.

At step 410, the vehicle can determine if it is located at the starting point of the stored driving route (e.g., as described above with references to FIGS. 1 and 2A-2C). In accordance with a determination that the vehicle is not located at the designated starting point, the vehicle can enter a manual driving mode (e.g., allow the driver to take over driving operations) at step 410. In accordance with a determination that the vehicle is located at the designated starting point, the vehicle can enter an automated driving mode (e.g., drives autonomously without user input) and can perform the driving route at step 430 (e.g., as described above with references to FIGS. 1 and 2A-2C). In some examples, any waypoint, other than the ending point, can serve as the starting point. In this way, the driver can take over driving operations at any point of the driving route and can return to the automated driving mode at any subsequent waypoint.

At step 440, the vehicle can determine if a cautionary scenario is detected. As described above, a cautionary scenario can include detecting an upcoming traffic light, a yield sign, a school zone, a vulnerable road user or object on the driving route, dangerous weather conditions (e.g., rainy, foggy, etc.), a malfunctioning sensor or camera, and/or any other scenario that may require the vehicle to enter a manual driving mode (e.g., allow the driver to take over driving operations). In some examples, a cautionary scenario can include not detecting anticipated landmarks from the feature map. In accordance with a determination that a cautionary scenario is not detected, process 400 can return to step 430. In accordance with a determination that a cautionary scenario is detected, the vehicle can take a precautionary action as step 450 (e.g., as described above with references to FIGS. 1 and 2A-2C). As described above, this precautionary action can be stopping the vehicle and waiting for the cautionary scenario to end (e.g., wait for a pedestrian to move out of the driving route), stopping the vehicle and waiting for the driver to indicate when it is safe to resume driving, allowing the driver to take over driving operations, and/or activating visual and/or audio indicators. As described above, the driver can notify the vehicle when it is safe to continue to navigate along the driving route through a control system such as buttons, a touch screen, a voice command, a computer, a smart phone, or any device or system that allows user input to be entered. Visual indicators can include one or more of a headlight, a hazard light, a smog light, or any light source on the outside or the inside of the vehicle. The audio indicators can include one or more of a horn, a speaker, an alarm system, and/or any other sound source in the vehicle. In some examples, the vehicle will activate visual and/or audio indicators to warn the driver that she will be required to take over driving operations within a few seconds (e.g., 3 to 10 seconds). In some examples, the vehicle will stop and activate the hazard lights if the driver is unable to take over driver operations. In some examples, stationary systems on traffic lights (e.g., a "smart" traffic light) can be configured to communicate information about the traffic lights to the vehicle. For example, these stationary systems can communicate to vehicles when to stop, when to slow down, or when to continue driving at traffic lights. In some examples, process 400 can end when the vehicle reaches and/or recognizes the ending point of the stored route.

Figure 5:
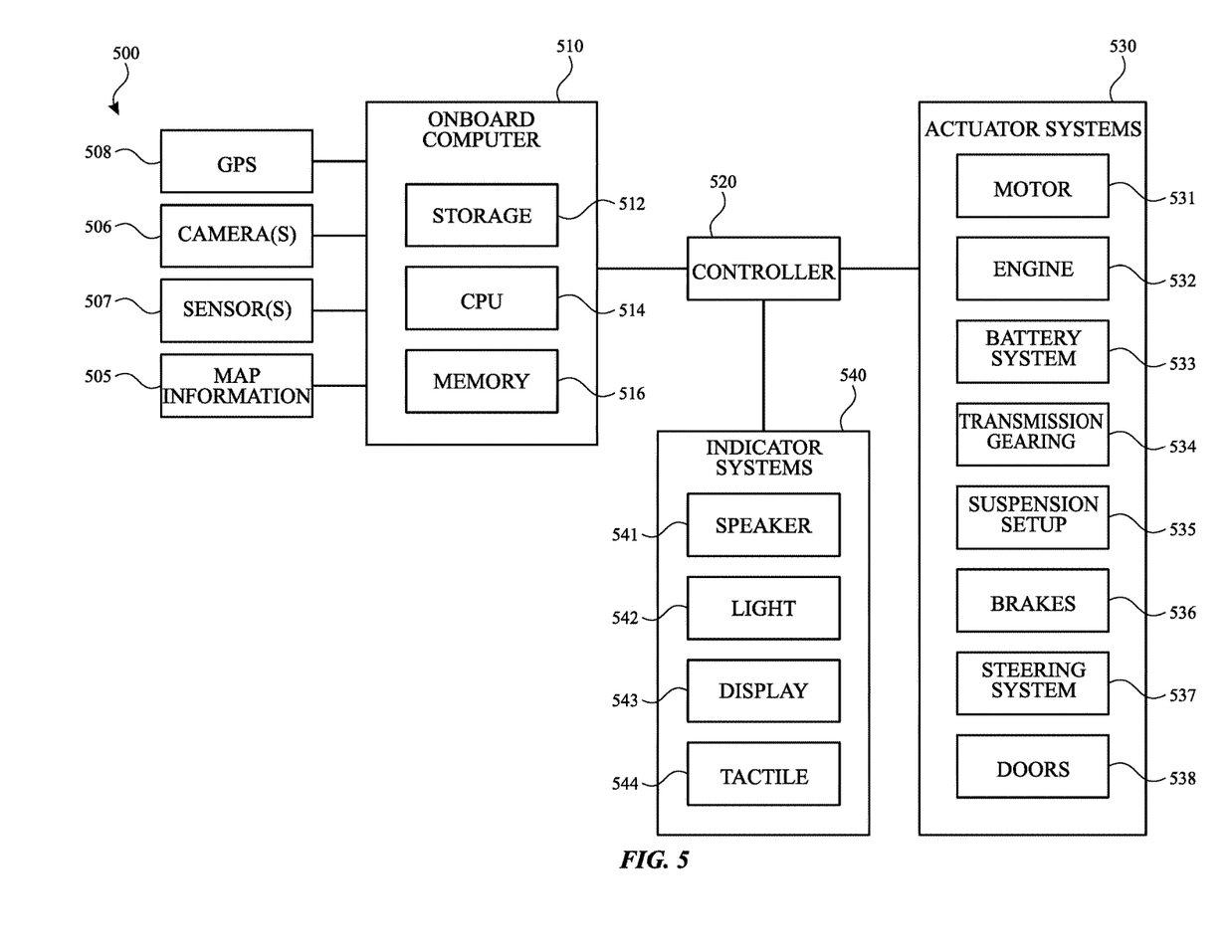
FIG. 5 illustrates an exemplary system block diagram of a vehicle control system according to examples of the disclosure.

FIG. 5 illustrates an exemplary system block diagram of vehicle control system 500 according to examples of the disclosure. Vehicle control system 500 can perform any of the methods described with reference to FIGS. 1-4. System 500 can be incorporated into a vehicle, such as a consumer automobile. Other example vehicles that may incorporate the system 500 include, without limitation, airplanes, boats, or industrial automobiles. Vehicle control system 500 can include one or more cameras 506 capable of capturing image data (e.g., video data) for determining various features of the vehicle's surroundings, as described with reference to FIGS. 1-4. Vehicle control system 500 can also include one or more other sensors 507 (e.g., radar, ultrasonic, LIDAR, etc.)

capable of detecting various features of the vehicle's surroundings, and a Global Positioning System (GPS) receiver 508 capable of determining the location of the vehicle. The features of the vehicle's surroundings can be used in determining the vehicle's location and orientation. The features of the vehicle's surroundings can also be used in recording feature maps and driving routes (e.g., as described above with reference to FIGS. 1-4). Vehicle control system 500 can also receive (e.g., via an internet connection) feature map information and/or traffic light information via a map information interface 505 (e.g., a cellular internet interface, a Wi-Fi internet interface, etc.).

Vehicle control system 500 can include an on-board computer 510 that is coupled to the cameras 506, sensors 507, GPS receiver 508, and map information interface 505, and that is capable of receiving the image data from the cameras and/or outputs from the sensors 507, the GPS receiver 508, and map information interface 505. The on-board computer 510 can be capable of recording a feature map and a driving route, and determining how to navigate the vehicle along the driving route, as described in this disclosure. On-board computer 510 can include storage 512, memory 516, and a processor 514. Processor 514 can perform any of the methods described with reference to FIGS. 1-4. Additionally, storage 512 and/or memory 516 can store data and instructions for performing any of the methods described with reference to FIGS. 1-4. Storage 512 and/or memory 516 can be any non-transitory computer readable storage medium, such as a solid-state drive or a hard disk drive, among other possibilities. The vehicle control system 500 can also include a controller 520 capable of controlling one or more aspects of vehicle operation, such as performing autonomous driving operations using the feature map and driving route stored on the on-board computer 510, as described with reference to FIGS. 1-4.

In some examples, the vehicle control system 500 can be connected to (e.g., via controller 520) one or more actuator systems 530 in the vehicle and one or more indicator systems 540 in the vehicle. The one or more actuator systems 530 can include, but are not limited to, a motor 531 or engine 532, battery system 533, transmission gearing 534, suspension setup 535, brakes 536, steering system 537 and door system 538. The vehicle control system 500 can control, via controller 520, one or more of these actuator systems 530 during vehicle operation; for example, to control the vehicle during autonomous driving operations, which can utilize the feature map and driving route stored on the on-board computer 510, using the motor 531 or engine 532, battery system 533, transmission gearing 534, suspension setup 535, brakes 536 and/or steering system 537, etc. Actuator systems 530 can also include sensors that send dead reckoning information (e.g., steering information, speed information, etc.) to on-board computer 510 (e.g., via controller 520) to determine the vehicle's location and orientation. The one or more indicator systems 540 can include, but are not limited to, one or more speakers 541 in the vehicle (e.g., as part of an entertainment system in the vehicle), one or more lights 542 in the vehicle, one or more displays 543 in the vehicle (e.g., as part of a control or entertainment system in the vehicle) and one or more tactile actuators 544 in the vehicle (e.g., as part of a steering wheel or seat in the vehicle). The vehicle control system 500 can control, via controller 520, one or more of these indicator systems 540 to provide visual and/or audio indications that the vehicle detected a cautionary scenario.

Thus, the examples of the disclosure provide various ways to record and follow a driving route to safely navigate the vehicle autonomously.

Therefore, according to the above, some examples of the disclosure are directed to a system for use in a vehicle, the system comprising: one or more sensors; one or more processors coupled to the one or more sensors; and a memory including instructions, which when executed by the one or more processors, cause the one or more processors to perform a method comprising: retrieving a stored route for the vehicle, the stored route comprising a plurality of waypoints corresponding to different locations along the route, each waypoint associated with one or more features along the route on a feature map; and navigating the vehicle along the stored route by navigating the vehicle from waypoint to waypoint in the stored route using the one or more sensors to: detect one or more features in an area surrounding the vehicle; and localize the vehicle at each waypoint by comparing the one or more features in the area surrounding the vehicle with the one or more features associated with each respective waypoint in the feature map. Additionally or alternatively to one or more of the examples disclosed above, in some examples, the one or more features in the feature map comprise one or more of a traffic light, a yield sign, a school zone, a building, road markings and a tree. Additionally or alternatively to one or more of the examples disclosed above, in some examples, the one or more features in the area surrounding the vehicle comprise one or more of a traffic light, a yield sign, a school zone, a building, road markings and a tree. Additionally or alternatively to one or more of the examples disclosed above, in some examples, the one or more sensors comprise one or more cameras. Additionally or alternatively to one or more of the examples disclosed above, in some examples, localizing the vehicle at each waypoint is further performed by using a GPS signal. Additionally or alternatively to one or more of the examples disclosed above, in some examples, the method further comprises: prior to retrieving the stored route for the vehicle, creating the stored route for the vehicle by recording one or more locations of the vehicle as the vehicle drives the stored route, and recording one or more features of the area surrounding the vehicle, using the one or more sensors, associated with each of the one or more locations of the vehicle as the vehicle drives the stored route. Additionally or alternatively to one or more of the examples disclosed above, in some examples, the method further comprises: prior to retrieving the stored route for the vehicle and navigating the vehicle along the stored route, requiring the vehicle to drive the stored route multiple times in multiple lighting conditions. Additionally or alternatively to one or more of the examples disclosed above, in some examples, the one or more features detected in the area surrounding the vehicle at a respective waypoint differ from the one or more features associated with the respective waypoint in the feature map. Additionally or alternatively to one or more of the examples disclosed above, in some examples, the method further comprises: while navigating the vehicle along the stored route: determining whether the one or more features in the area surrounding the vehicle are indicative of a cautionary scenario; in response to determining whether the one or more features in the area surrounding the vehicle are indicative of the cautionary scenario: in accordance with a determination that the one or more features in the area surrounding the vehicle are indicative of the cautionary scenario, performing a precautionary action; and in accordance with a determination that the one or more features in the area surrounding the vehicle are not indicative of the cautionary scenario, foregoing performing the precautionary action. Additionally or alternatively to one or more of the examples disclosed above, in some examples, the one or more features in the area surrounding the vehicle comprise a traffic light; and the traffic light is indicative of the cautionary scenario. Additionally or alternatively to one or more of the examples disclosed above, in some examples, the one or more features in the area surrounding the vehicle comprise a yield sign; and the yield sign is indicative of the cautionary scenario. Additionally or alternatively to one or more of the examples disclosed above, in some examples, the one or more features in the area surrounding the vehicle comprise a school zone; and the school zone is indicative of the cautionary scenario. Additionally or alternatively to one or more of the examples disclosed above, in some examples, the one or more features in the area surrounding the vehicle comprise a vulnerable road user on the stored route; and the vulnerable road user on the stored route is indicative of the cautionary scenario. Additionally or alternatively to one or more of the examples disclosed above, in some examples, the vulnerable road user on the stored route comprises one or more of a pedestrian, a motorcycle, and a bicycle. Additionally or alternatively to one or more of the examples disclosed above, in some examples, the precautionary action comprises transitioning the vehicle from a first mode of operation to a second mode of operation. Additionally or alternatively to one or more of the examples disclosed above, in some examples, the first mode of operation comprises an autonomous mode of operation, and the second mode of operation comprises a manual mode of operation. Additionally or alternatively to one or more of the examples disclosed above, in some examples, the method further comprises: while navigating the vehicle along the stored route: determining that one or more of the sensors are malfunctioning; and in response to determining that the one or more sensors are malfunctioning, performing a precautionary action.

Some examples of the disclosure are directed to a non-transitory computer-readable medium including instructions, which when executed by one or more processors, cause the one or more processors to perform a method comprising: retrieving a stored route for a vehicle, the stored route comprising a plurality of waypoints corresponding to different locations along the route, each waypoint associated with one or more features along the route on a feature map; and navigating the vehicle along the stored route by navigating the vehicle from waypoint to waypoint in the stored route using one or more sensors on the vehicle to: detect one or more features in an area surrounding the vehicle; and localize the vehicle at each waypoint by comparing the one or more features in the area surrounding the vehicle with the one or more features associated with each respective waypoint in the feature map.

Some examples of the disclosure are directed to a method comprising: retrieving a stored route for a vehicle, the stored route comprising a plurality of waypoints corresponding to different locations along the route, each waypoint associated with one or more features along the route on a feature map; and navigating the vehicle along the stored route by navigating the vehicle from waypoint to waypoint in the stored route using one or more sensors on the vehicle to: detect one or more features in an area surrounding the vehicle; and localize the vehicle at each waypoint by comparing the one or more features in the area surrounding the vehicle with the one or more features associated with each respective waypoint in the feature map.

Although examples have been fully described with reference to the accompanying drawings, it is to be noted that various changes and modifications will become apparent to those skilled in the art. Such changes and modifications are to be understood as being included within the scope of examples of this disclosure as defined by the appended claims.

The invention claimed is:

1. A system for use in a vehicle, the system comprising:
one or more sensors;
one or more processors coupled to the one or more sensors; and
a memory including instructions, which when executed by the one or more processors, cause the one or more processors to perform a method comprising:
initially requiring the vehicle to drive a route multiple times in multiple lighting conditions;
subsequently retrieving the route as a stored route for the vehicle, the stored route comprising a plurality of waypoints corresponding to different locations along the route, each waypoint associated with one or more features along the route on a feature map; and
subsequently navigating the vehicle along the stored route by navigating the vehicle from waypoint to waypoint in the stored route using the one or more sensors to:
detect one or more features in an area surrounding the vehicle; and
localize the vehicle at each waypoint by comparing the one or more features in the area surrounding the vehicle with the one or more features associated with each respective waypoint in the feature map.

2. The system of claim 1, wherein the one or more features in the feature map comprise one or more of a traffic light, a yield sign, a school zone, a building, road markings and a tree.

3. The system of claim 1, wherein the one or more features in the area surrounding the vehicle comprise one or more of a traffic light, a yield sign, a school zone, a building, road markings and a tree.

4. The system of claim 1, wherein the one or more sensors comprise one or more cameras.

5. The system of claim 1, wherein localizing the vehicle at each waypoint is further performed by using a GPS signal.

6. The system of claim 1, wherein the method further comprises:
prior to retrieving the stored route for the vehicle, creating the stored route for the vehicle by recording one or more locations of the vehicle as the vehicle drives the stored route, and recording one or more features of the area surrounding the vehicle, using the one or more sensors, associated with each of the one or more locations of the vehicle as the vehicle drives the stored route.

7. The system of claim 1, wherein the one or more features detected in the area surrounding the vehicle at a respective waypoint differ from the one or more features associated with the respective waypoint in the feature map.

8. The system of claim 1, wherein the method further comprises:
while navigating the vehicle along the stored route:
determining whether the one or more features in the area surrounding the vehicle are indicative of a cautionary scenario;

in response to determining whether the one or more features in the area surrounding the vehicle are indicative of the cautionary scenario:
in accordance with a determination that the one or more features in the area surrounding the vehicle are indicative of the cautionary scenario, performing a precautionary action; and
in accordance with a determination that the one or more features in the area surrounding the vehicle are not indicative of the cautionary scenario, foregoing performing the precautionary action.

9. The system of claim 8, wherein:
the one or more features in the area surrounding the vehicle comprise a traffic light; and
the traffic light is indicative of the cautionary scenario.

10. The system of claim 8, wherein:
the one or more features in the area surrounding the vehicle comprise a yield sign; and
the yield sign is indicative of the cautionary scenario.

11. The system of claim 8, wherein:
the one or more features in the area surrounding the vehicle comprise a school zone; and
the school zone is indicative of the cautionary scenario.

12. The system of claim 8, wherein:
the one or more features in the area surrounding the vehicle comprise a vulnerable road user on the stored route; and
the vulnerable road user on the stored route is indicative of the cautionary scenario.

13. The system of claim 12, wherein the vulnerable road user on the stored route comprises one or more of a pedestrian, a motorcycle, and a bicycle.

14. The system of claim 8, wherein the precautionary action comprises transitioning the vehicle from a first mode of operation to a second mode of operation.

15. The system of claim 14, wherein the first mode of operation comprises an autonomous mode of operation, and the second mode of operation comprises a manual mode of operation.

16. The system of claim 1, wherein:
while navigating the vehicle along the stored route:
determining that one or more of the sensors are malfunctioning; and
in response to determining that the one or more sensors are malfunctioning, performing a precautionary action.

17. A non-transitory computer-readable medium including instructions, which when executed by one or more processors, cause the one or more processors to perform a method comprising:
initially requiring a vehicle to drive a route multiple times in multiple lighting conditions;
subsequently retrieving the route as a stored route for the vehicle, the stored route comprising a plurality of waypoints corresponding to different locations along the route, each waypoint associated with one or more features along the route on a feature map; and
subsequently navigating the vehicle along the stored route by navigating the vehicle from waypoint to waypoint in the stored route using one or more sensors on the vehicle to:
detect one or more features in an area surrounding the vehicle; and
localize the vehicle at each waypoint by comparing the one or more features in the area surrounding the vehicle with the one or more features associated with each respective waypoint in the feature map.

18. A method comprising:
initially requiring a vehicle to drive a route multiple times in multiple lighting conditions;
subsequently retrieving the route as a stored route for the vehicle, the stored route comprising a plurality of waypoints corresponding to different locations along the route, each waypoint associated with one or more features along the route on a feature map; and
subsequently navigating the vehicle along the stored route by navigating the vehicle from waypoint to waypoint in the stored route using one or more sensors on the vehicle to:
detect one or more features in an area surrounding the vehicle; and
localize the vehicle at each waypoint by comparing the one or more features in the area surrounding the vehicle with the one or more features associated with each respective waypoint in the feature map.

* * * * *